United States Patent
Edvardsson

(10) Patent No.: US 8,773,302 B2
(45) Date of Patent: Jul. 8, 2014

(54) MULTI-CHANNEL RADAR LEVEL GAUGE

(75) Inventor: Olov Edvardsson, Linköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 123 days.

(21) Appl. No.: 13/178,088

(22) Filed: Jul. 7, 2011

(65) Prior Publication Data

US 2013/0009803 A1    Jan. 10, 2013

(51) Int. Cl.
*G01S 13/08* (2006.01)

(52) U.S. Cl.
USPC ............................ 342/124; 342/118; 342/129

(58) Field of Classification Search
USPC .................................. 342/118, 124; 340/612
See application file for complete search history.

(56) References Cited

U.S. PATENT DOCUMENTS

| | | | | |
|---|---|---|---|---|
| 3,319,190 A | * | 5/1967 | Shively et al. | 333/115 |
| 4,365,215 A | * | 12/1982 | Landry | 333/127 |
| 4,489,601 A | * | 12/1984 | Rao et al. | 73/290 R |
| 5,282,239 A | * | 1/1994 | Yokoi et al. | 455/465 |
| 5,609,059 A | * | 3/1997 | McEwan | 73/290 R |
| 6,414,625 B1 | | 7/2002 | Kleman | 342/124 |
| 6,915,689 B2 | * | 7/2005 | Edvardsson | 73/290 V |
| 6,922,150 B2 | * | 7/2005 | Håll et al. | 340/612 |
| 7,106,247 B2 | | 9/2006 | Edvardsson | 342/124 |
| 7,265,558 B1 | * | 9/2007 | Penndal et al. | 324/637 |
| 2004/0036617 A1 | | 2/2004 | Hall et al. | 340/612 |
| 2004/0099058 A1 | | 5/2004 | Edvardsson | 73/290 V |
| 2005/0113669 A1 | * | 5/2005 | Helfer et al. | 600/412 |

OTHER PUBLICATIONS

PCT International Search Report for PCT Application No. PCT/EP2011/066582, dated Mar. 13, 2012, 4 pages.
Written Opinion for PCT International Search Report for PCT Application No. PCT/EP2011/066582, dated Mar. 13, 2012, 8 pages.

* cited by examiner

*Primary Examiner* — John B Sotomayor
*Assistant Examiner* — Marcus Windrich
(74) *Attorney, Agent, or Firm* — Westman, Champlin & Koehler

(57) ABSTRACT

A level gauge for detecting process variables related to a distance to a surface of a content in a tank, comprising a first and second functionally independent circuitry arrangements comprising transceiver circuitry and processing circuitry. The gauge further comprises a transmission line probe connected to the circuitry arrangements, the transmission line probe extending into the content in the tank and being adapted allow propagation of first and second transmission modes, and a feeding arrangement connected to couple electromagnetic signals into the probe in first and second propagation modes.

10 Claims, 4 Drawing Sheets

MULTI-CHANNEL RADAR LEVEL GAUGE

FIELD OF THE INVENTION

The present invention relates to a radar level gauge using electromagnetic waves guided by a guided wave probe into a tank to determine a distance to a surface of a product in the tank.

BACKGROUND OF THE INVENTION

Radar level gauging (RLG) to measure the level of a filling material, such as a liquid or a solid like a granulate is an increasingly important method for level gauging in tanks, containers, etc. Many different types of RLG systems are previously known. An example of such a systems is disclosed in U.S. Pat. No. 7,106,247 by the same applicant.

Due to safety restrictions, environmental laws and requirements, etc, there is often a need for several measurements of the surface level of the medium in the container, which measurements are completely separated and functionally independent from each other. For example, in radar level gauging systems for a tanker's load containers, at least one alarm function (e.g. overfill alarm) that is functionally independent of the level measuring system is required.

Functional independence here means that a fault in one system does not render the other system(s) inoperative. Such independence can be achieved by ensuring that there are no common electrical circuits and cabling, i.e. there must not be any galvanic contact between different measuring systems. One way to achieve this is to simply install at least two complete independent level gauges. However, in order to save costs, it may be permissible (by technical and regulatory requirements) to share fixed mechanical constructions, which cannot normally malfunction.

Several such radar level gauging system providing two or more functionally independent channels are previously known. For example, U.S. Pat. No. 6,414,526 assigned to the same assignee discloses a device and a method for measuring the level of the surface of a filling material in a container involving more than one radar channel.

Independent radar level gauges using the same physical antenna but otherwise electrically independent have found use for redundancy at a low cost. The method to connect more than one sensor to one antenna is a very cost effective way to implement e.g. a system with a level sensor and an independent overfill alarm, etc, and has gained wide acceptance among users and authorities.

However, in some applications radar level gauges using antennas to provide free propagating signals are not suitable, and a wave guiding structure is used to guide the waves. Based on propagation mechanism three different types of wave guiding structures are known in the prior art.

Wave guides of the first type are hollow (e.g. a pipe of suitable cross section) and "thick" in the sense that they have a cross section of half a wavelength or more, possibly reduced by a dielectric filling. The electromagnetic fields in such a waveguide always have at least one field component along the direction of propagation. When used in radar level applications, wave guides of this type are referred to as "still pipes", and must be perforated to get the same level inside as outside.

Wave guiding structures of the second type are transmission lines with two or more conductors, such as a twin line or a coaxial line. Transmission line wave guides have a diameter much smaller than the wavelength of the transmitted waves, and one typical feature is that the electromagnetic fields are transverse or of TEM-type (Transverse Electro-Magnetic fields). For practical level gauging applications using signals below 1 GHz (with wavelength above 300 mm) a transmission line diameter of 3-20 mm is commonly used. A too small diameter will increase resistive losses and may cause problems with material clogging and mechanical strength.

Finally, wave guiding structures of the third type are surface wave guides (SWGs), such as a single line transmission line or tube with or without dielectric coating. A surface wave guide can be very thin as compared to the wavelength (4-8 mm is a common SWG diameter for use below 1 GHz) but they also have field along the propagation direction and also fields well outside of the SWG. In contrast to the transmission line probe it needs more space free as there are fields outside the wire. In case of a single metal wire, a poor electric conductor such as stainless steel is suitable. The single wire probe is very practical and robust to use for level gauging.

Wave guiding structures of the second and third type thus both have a diameter much smaller than the wavelength of the transmitted waves. In radar level gauging applications such waveguides are normally referred to as "probes", and the detection principle is sometimes referred to as guided wave radar (GWR). The most common type uses short pulses (around 1 ns) without carrier and occupy a frequency range of roughly 0.1-1 GHz.

GENERAL DISCLOSURE OF THE INVENTION

It is an object of the present invention to provide a multi-channel level gauge using a transmission line probe.

This and other objects are achieved by a level gauge for detecting process variables related to a distance to a surface of a content in a tank, the level gauge comprising a first circuitry arrangement comprising first transceiver circuitry for generating, transmitting and receiving first electromagnetic signals, and first processing circuitry connected to the first transceiver circuitry for determining a first process variable, a second circuitry arrangement comprising second transceiver circuitry for generating, transmitting and receiving second electromagnetic signals, and second processing circuitry connected to the second transceiver circuitry for determining a second process variable, the first and second circuitry arrangements being functionally independent. The gauge further comprises one transmission line probe connected to the first and second circuitry arrangements, the transmission line probe extending into the content in the tank and being adapted to guide the first and second electromagnetic signals towards and into the content and to guide reflected signals back to the first and second electronics arrangements, the transmission line probe being adapted to allow propagation of first and second transmission modes, and a feeding arrangement, connected to receive the first electromagnetic signal and couple the first electromagnetic signal into the transmission line probe in a first propagation mode, and connected to receive the second electromagnetic signal and couple the second electromagnetic signal into the wave guiding structure in a second propagation mode.

The present invention is based on the realization that a transmission line probe in many cases may be designed to allow for two or more transmission modes, and that these modes may be used by functionally independent channels.

According to this design, the two circuitry arrangements are connected to one transmission line probe by means of a feeding arrangement that ensures that the signals are coupled into the probe in different propagation modes. This enables the circuitry arrangements to distinguish between signals associated with different circuitry arrangements, thereby effectively providing two measurement channels.

The use of different modes provides isolation between the channels, ensuring little or no leakage between the channels. As a consequence, it is not necessary that the first and second electromagnetic signals are distinguishable from each other. In fact, according to a preferred embodiment, the first and second electronics units are designed to transmit identical electromagnetic signals, i.e. signals having the same frequency and amplitude behavior.

The circuitry arrangements may therefore be functionally identical, and most preferably multiple samples from the same manufacturing process. This makes the system efficient to manufacture. Two substantially identical units are simply connected to the feeding arrangement, which is connected to the transmission line probe.

The probe can be a twin-line probe, and in this case the feeding arrangement can be adapted to feed the first signal as a TEM mode between the lines and to feed the second signal as a SWG mode utilizing at least one of the lines. The TEM mode signal is preferably in anti-phase with respect to the SWG mode signal.

Alternatively, the probe can be a coaxial line having a central lead and a perforated shield allowing signal propagation on its exterior surface. In this case, the feeding arrangement can be adapted to transmit a first signal (TEM mode) along the central lead, and to transmit a second signal (SWG mode) along the exterior surface of the shield. Many other types of transmission lines may be employed, and by using three conductors (or more) two independent propagation modes (or one less than the number of conductors) of TEM-type can be created.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

In the present detailed description, various embodiments of the radar level gauge system according to the present invention are mainly discussed with reference to radar level gauge systems using pulsed signals and filling level determination by means of measuring the time between transmitted and reflected pulses. However, as is evident to the person skilled in the relevant art, the teachings of the present invention are equally applicable to radar level gauge systems utilizing phase information for determining the filling level through, for example, frequency-modulated continuous wave (FMCW) measurements. When pulses modulated on a carrier are used, phase information can also be utilized.

Figure 1:
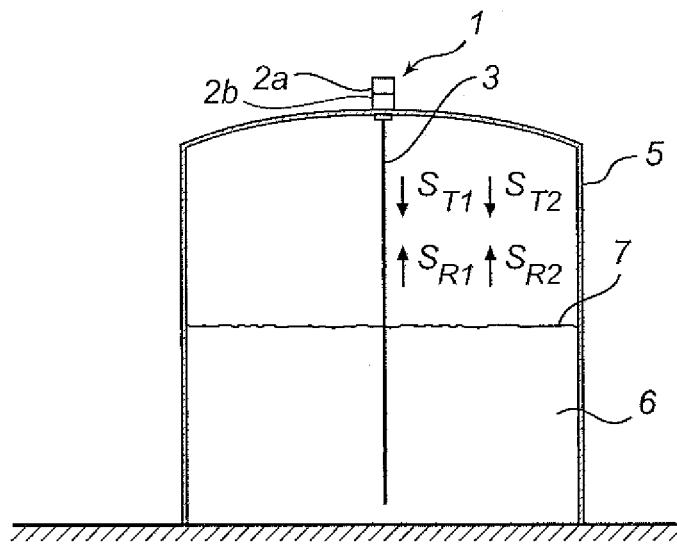
FIG. 1 schematically shows a tank equipped with a guided wave radar level gauge according to an embodiment of the present invention.

FIG. 1 schematically illustrates a radar level gauge system 1 according to an embodiment of the present invention, comprising at least two measurement electronics units 2a, 2b, each including a circuitry arrangement with transceiver circuitry and processing circuitry. The electronics units 2a, 2b are each connected to a common probe 3 by means of a feeding arrangement 4, which will be described in more detail below. The radar level gauge system 1 is provided on a tank 5, which is partly filled with a product 6 to be gauged. By analyzing transmitted signals $S_{T1}$ and $S_{T2}$ being guided by the probe 3 towards the surface 7 of the product 6, and reflected signals $S_{R1}$ and $S_{R2}$ traveling back from the surface 7, the measurement electronics unit 2 can determine the distance between a reference position (such as the tank ceiling) and the surface 7 of the product 6, whereby the filling level or other process variable can be deduced. It should be noted that, although a tank 5 containing a single product 6 is discussed herein, the distance to any material interface along the probe can be measured in a similar manner.

Figure 2:
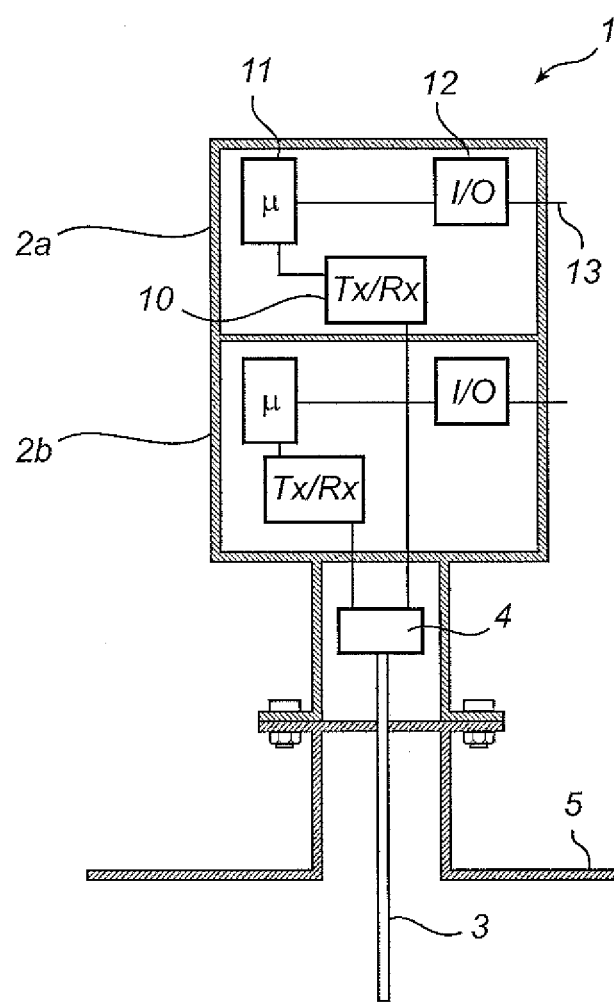
FIG. 2 schematically shows the level gauge in FIG. 1 in more detail.

As is schematically illustrated in FIG. 2, each electronics unit 2a, 2b comprises transceiver circuitry 10 for transmitting and receiving electromagnetic signals, processing circuitry 11, which is connected to the transceiver 10 for control of the transceiver and processing of signals received by the transceiver to determine the filling level of the product 6 in the tank 5. The processing circuitry 11 is, furthermore, connectable to external communication lines 13 for analog and/or digital communication via an interface 12. Moreover, although not shown in FIG. 1, the radar level gauge system 1 is typically connectable to an external power source, or may be powered through the external communication lines 13. Alternatively, the gauge may communicate wirelessly using e.g. a Wireless HART protocol, and use a local power supply (not shown) with batteries or other means of scavenging energy for autonomous operation.

Figure 3A:
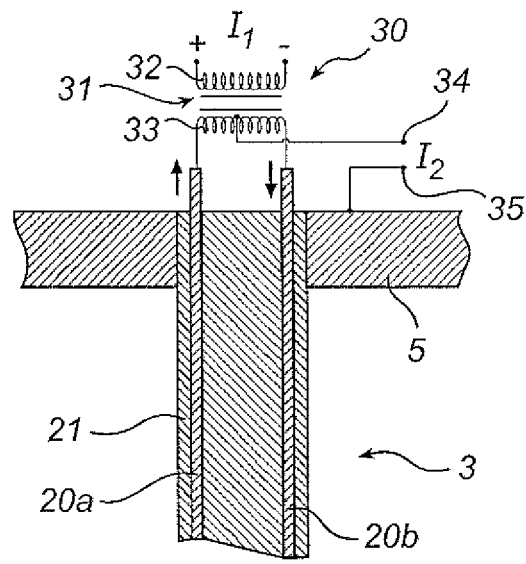
FIGS. 3a and 3b schematically show two examples of the feeding arrangement in FIG. 2 connected to a twin line probe.
Figure 3B:
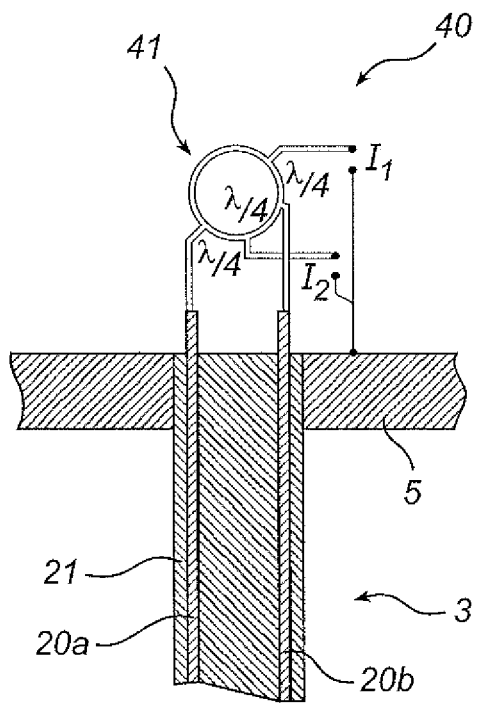

FIGS. 3a-b schematically illustrate two examples of feeding arrangements 30 for creating and feeding a transverse electric field (TEM) mode and a surface wave guiding (SWG) mode into a transmission line probe 3. In these examples, the transmission line probe 3 comprises a first probe conductor 20a, a second probe conductor 20b extending substantially in parallel with the first probe conductor 20a, and an enclosing dielectric structure 21 surrounding the first 20a and second 20b probe conductors.

Referring first to FIG. 3a, the guided wave radar level gauge system 1 further comprises a feeding arrangement 30 for creating and feeding the first propagation mode signal $S_{T1}$ and the second propagation mode signal $S_{T2}$ to the transmission line probe 3.

The feeding arrangement 30 comprises a transformer 31 with a primary winding 32 and a secondary winding 33. The secondary winding 33 is connected between the first probe conductor 20a and the second probe conductor 20b. To allow feeding of the transmitted electromagnetic signals $S_{T1}$ and $S_{T2}$ to the transmission line probe 3, the feeding arrangement 30 further comprises a first input $I_1$ across the primary winding 32 and a second input $I_2$ with one terminal 34 connected in the middle of the secondary winding 33 and another terminal connected to the tank wall 5 in the vicinity of the transmission line probe 3. Such a transformer connection is commercially available in the most common frequency range 100-1000 MHz used by GWRs. A small ferrite core is typically used in the transformer.

By providing the transmitted signal $S_{T1}$ to the first input I/and the second signal $S_{T2}$ to the second input $I_2$, two different propagation modes are created and fed to the transmission line probe 3. The first signal $S_{T1}$ will be provided to the first 20a and second 20b probe conductors in anti-phase or opposite phase and will propagate along the transmission line probe 3 as a TEM-mode. The second signal $S_{T2}$ will be provided to the first 20a and second 20b probe conductors in phase and will propagate along the transmission line probe 3 as a SWG-mode.

Turning now to FIG. 3b, a feeding arrangement 40 is schematically shown, which comprises a so-called hybrid ring 41. As indicated in FIG. 3b, the connections of the ring are separated from each other a distance corresponding to a quarter wavelength (λ/4) of the transmitted signal. As is well known to those skilled in the art of microwave circuits, the dimensioning of the hybrid ring 41 provides for the creation and feeding of two different propagation modes. The hybrid ring 41 may advantageously be provided as a strip line on a circuit board. The same function can be obtained by pieces of coaxial cables or other types of transmission lines.

Again, the first signal $S_{T1}$ will be provided to the first 20a and second 20b probe conductors in anti-phase or opposite phase and will propagate along the transmission line probe 3 as a TEM-mode. The second signal $S_{T2}$ will be provided to the first 20a and second 20b probe conductors in phase and will propagate along the transmission line probe 3 as a SWG-mode.

Figure 4:
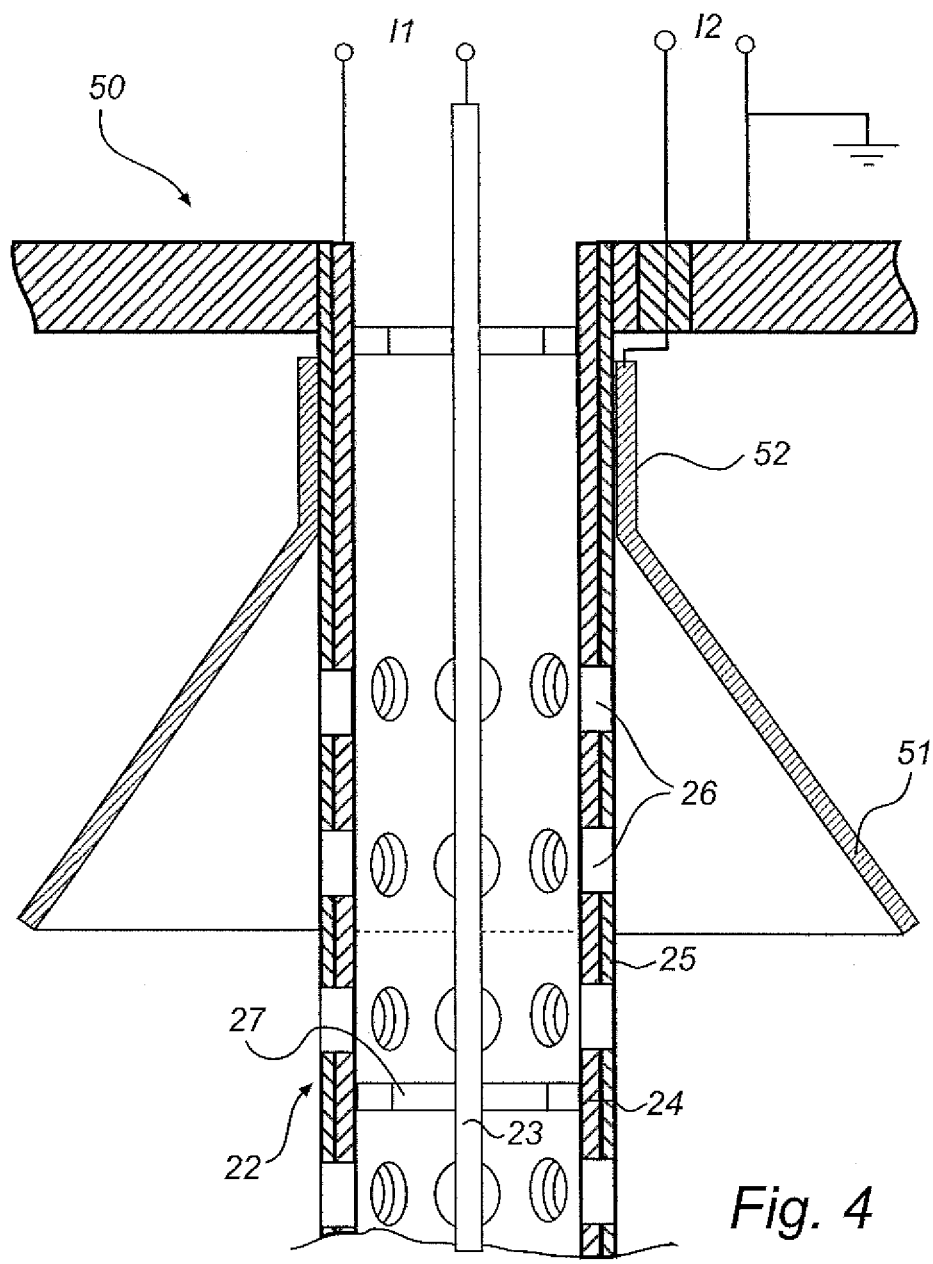
FIG. 4 shows a connection of a coaxial line probe according to an embodiment of the invention.
Figure 4A:
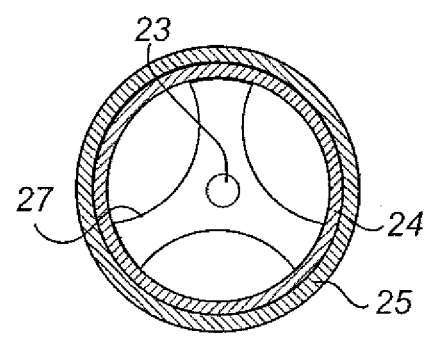
FIG. 4a shows a spacer element of the coaxial fine in FIG. 4.

FIG. 4 shows a further example of a feeding arrangement for creating and feeding a TEM mode and a surface wave guiding (SWG) mode into a transmission line probe. In this example the probe is a coaxial line 22, having a central line 23, and an outer metal tube 24. The exterior surface of the metal tube is coated with a dielectric coating 25. The tube 24 and coating 245 are perforated by openings 26, to allow the contents of the tank to enter the tube so as to influence signals in the central line 23. The central line 23 is separated from the inner walls of the tube 24 by dielectric spacers 27, arranged at suitable distances. The upper end of the coaxial line 22 is sealed from the outside by means of a suitable sealing arrangement (not shown).

The feeding arrangement 50 is here simply arranged to separate the two units 2a and 2b, and comprises a funnel 51 arranged with its narrow neck portion 52 attached around the coaxial line 22 and its wide opening facing down into the tank. The neck portion is isolated from the tube 24 by the dielectric coating 25. The first electromagnetic signal, from unit 2a, is coupled between the central lead 23 and the tube 24, to propagate in TEM mode. The second electromagnetic signal, from unit 2b, is connected between the funnel 51 and tube 24 to propagate in SWG mode. Preferably, the funnel is connected to ground.

The perforated coaxial line can also be shaped in some equivalent shape like a U-shaped metal shield with a centre conductor supported inside and able to support a SWG-mode on its outside.

Figure 5:
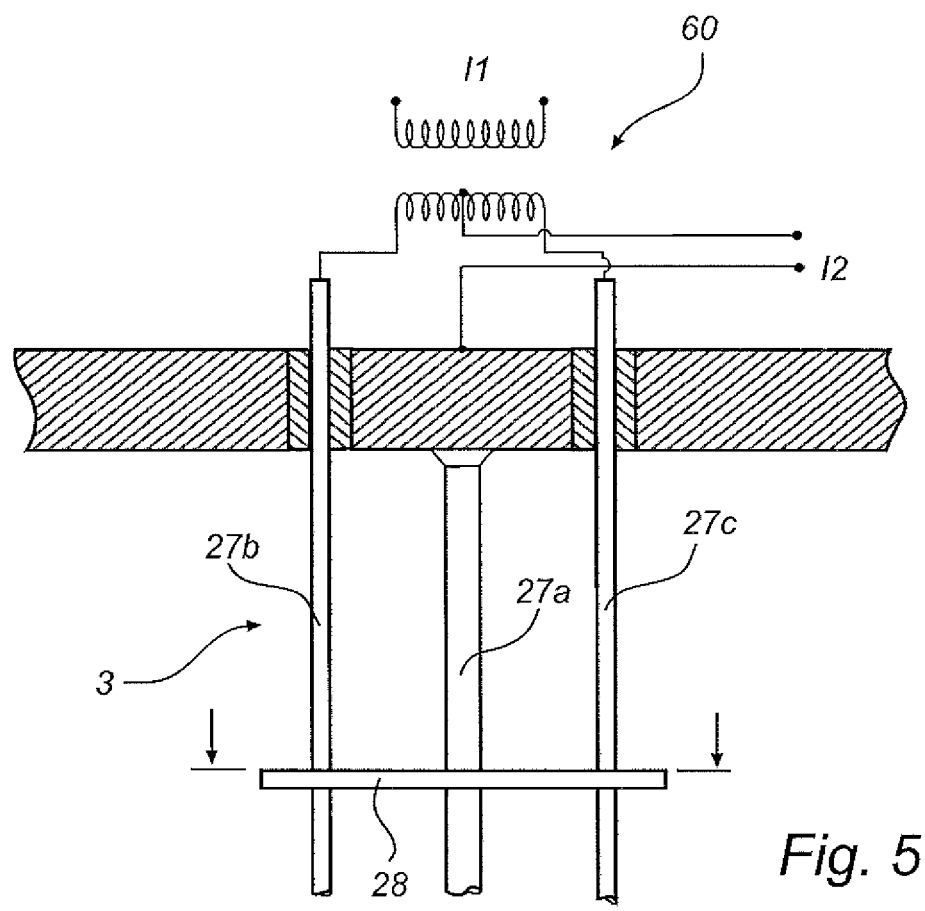
FIG. 5 shows a connection to a three wire probe according to an embodiment of the invention.
Figure 5A:
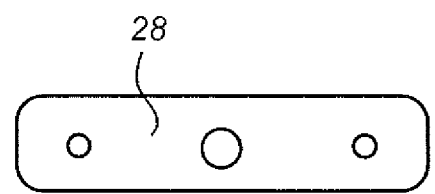
FIG. 5a shows a spacer element of the probe in FIG. 5.

FIG. 5 schematically illustrates an example of a feeding arrangement 60 for creating and feeding two different TEM modes into a transmission line probe 3 with three conductors. The feeding arrangement 60 may essentially correspond to the feeding arrangement in FIG. 3a or 3b, to provide two signals in phase and anti-phase. In the example in FIG. 5, the probe comprises a central conductor 27a, connected to ground, and two signal conductors 27b and 27c. The three conductors 27a-c may be freely suspended in the tank, only attached in the tank roof and bottom, and are then preferably secured at distance from each other by dielectric spacers 28, arranged at suitable distances.

The 3-conductor transmission line combines one conductor for ground and mechanical support with the possibility to separate two modes by in-phase and anti-phase feeding. The feeding arrangement 60 is arranged to receive the first electromagnetic signal from the circuitry arrangement 2a and couple it in a first in-phase TEM mode between the conductors 27a and 27b, and to receive the second electromagnetic signal from the circuitry arrangement 2b and couple it in a second anti-phase TEM mode between the conductors 27a and 27c.

Another way to form two independent modes in a three-conductor system is a three-phase system where the three conductors are essentially symmetric and fed by the phases 0°, 120° and 240° (first mode) and 0°, 240° and 120° (second mode).

In general, a probe can carry one less TEM mode than it has conductors. For three TEM modes, four conductors would be required, and so on.

The person skilled in the art realizes that the present invention by no means is limited to the preferred embodiments described above. On the contrary, many modifications and variations are possible within the scope of the appended claims.

What is claimed is:

1. A level gauge for detecting process variables related to a distance to a surface of a content in a tank, said level gauge comprising:
a first circuitry arrangement comprising first transceiver circuitry for generating, transmitting and receiving first electromagnetic signals, and first processing circuitry connected to the first transceiver circuitry for determining a first process variable,
a second circuitry arrangement comprising second transceiver circuitry for generating, transmitting and receiving second electromagnetic signals, and second processing circuitry connected to the second transceiver circuitry for determining a second process variable,
said first and second circuitry arrangements being functionally independent,
one transmission line probe connected to said first and second circuitry arrangements, said transmission line probe extending into the content in the tank and being adapted to guide said first and second electromagnetic signals towards and into the content and to guide reflected signals back to the first and second circuitry arrangements, said transmission line probe being adapted to allow propagation of first and second transmission modes,
a feeding arrangement, connected to receive said first electromagnetic signal and couple said first electromagnetic signal into said transmission line probe in a first propagation mode, and connected to receive said second electromagnetic signal and couple said second electromagnetic signal into said transmission line probe in a second propagation mode, said second propagation mode being a different propagation mode than said first propagation mode.

2. The level gauge according to claim 1, wherein the transmission line probe is a twin-line probe, and wherein the feeding arrangement is adapted to feed a TEM mode signal between the lines and to feed a SWG mode utilizing at least one of the lines.

3. The level gauge according to claim 2, wherein the TEM mode signal is in anti-phase with respect to the SWG mode signal.

4. The level gauge according to claim 1, wherein the transmission line probe is a coaxial line having a central lead and a perforated shield allowing signal propagation on its exterior surface, and wherein said feeding arrangement is adapted to feed a TEM mode signal along the central lead, and to feed a SWG mode signal along the exterior surface of the shield.

5. The level gauge according to claim 1, wherein the transmission line probe comprises at least three conducting lines, thereby allowing at least two TEM modes to propagate along the probe.

6. The level gauge according to claim 5, wherein the feeding arrangement is arranged to feed to TEM modes in phase and anti-phase.

7. The level gauge according to claim 5, wherein the feeding arrangement is arranged to feed three conducting lines symmetrically, with phases 0°, 120° and 240° providing a first TEM mode, and phases 0", 240° and 120° providing a second TEM mode.

8. The level gauge according to claim 1, further comprising a power divider arranged connected to said transmission line probe to provide insulation between signals having the same propagation mode.

9. The level gauge according to claim 1, wherein said first electromagnetic signal and said second electromagnetic signal are substantially identical.

10. The level gauge according to claim 9, wherein said first and second circuitry arrangements are functionally identical.

\* \* \* \* \*